R. C. JOHNSON.
MOTOR VEHICLE AND BOAT.
APPLICATION FILED NOV. 12, 1914.
1,151,272.
Patented Aug. 24, 1915.
3 SHEETS—SHEET 1.
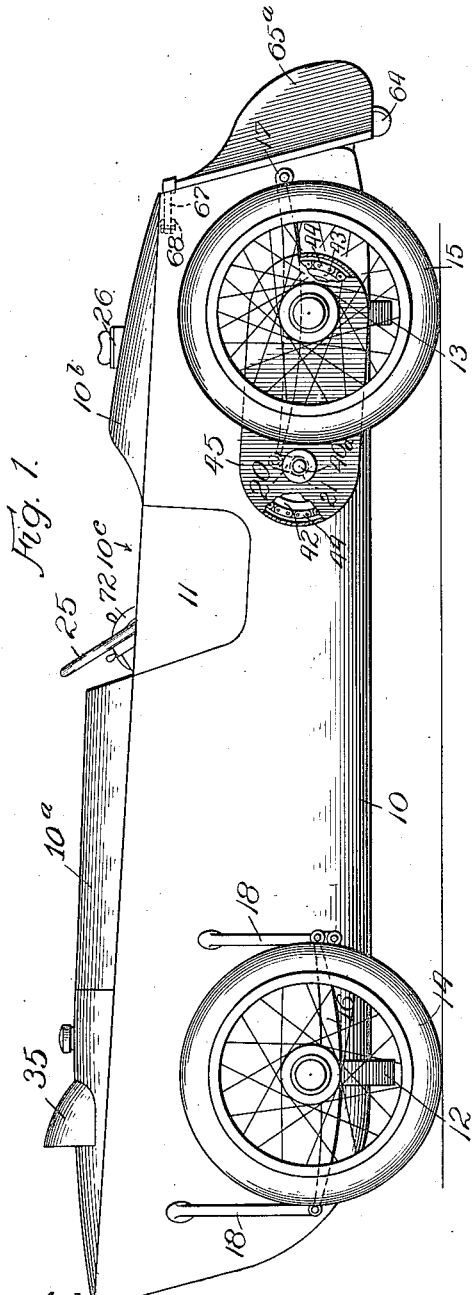
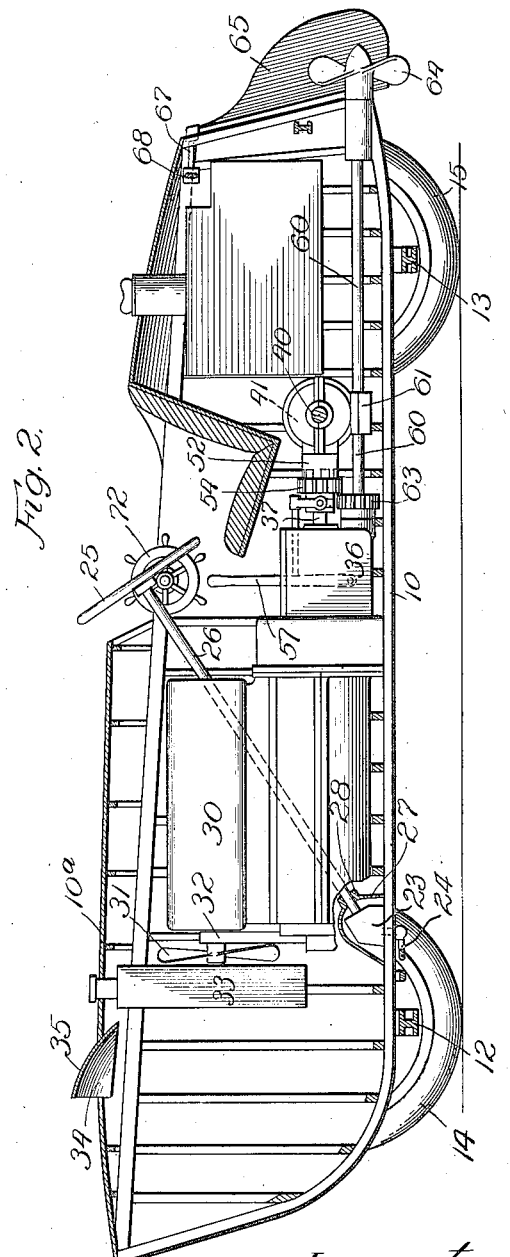

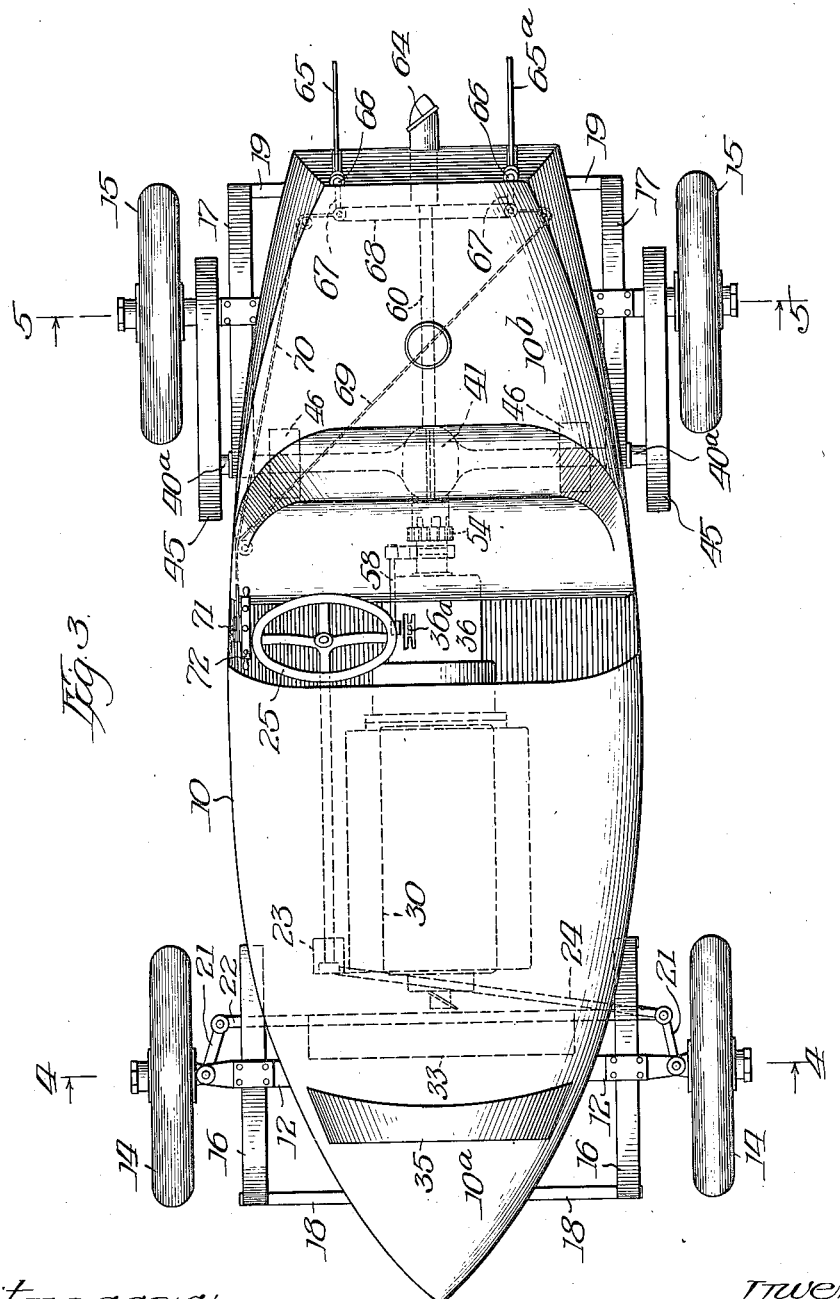

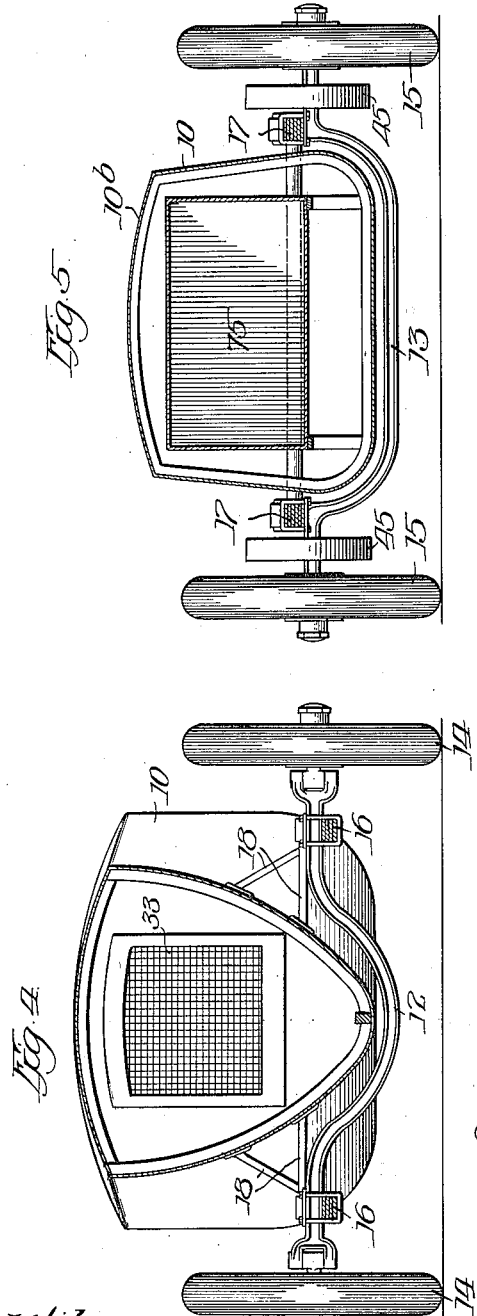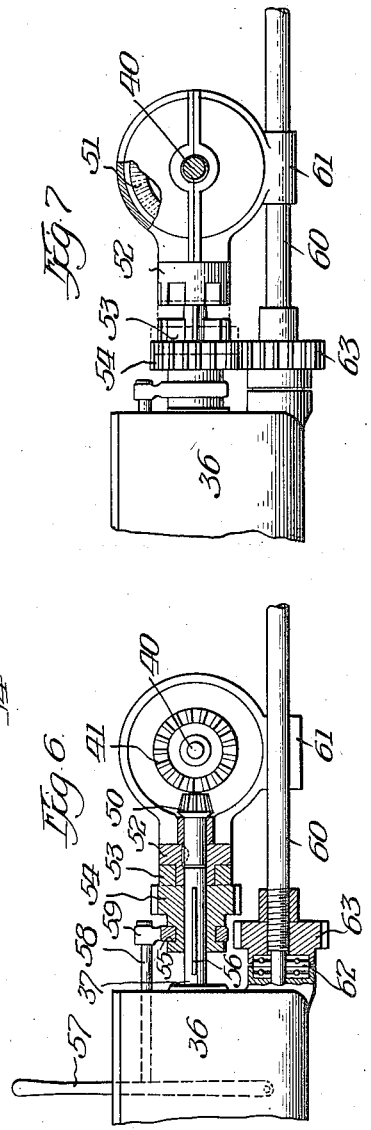

UNITED STATES PATENT OFFICE.

RALPH C. JOHNSON, OF CHICAGO, ILLINOIS.

MOTOR VEHICLE AND BOAT.

1,151,272.  Specification of Letters Patent.  Patented Aug. 24, 1915.

Application filed November 12, 1914. Serial No. 871,679.

*To all whom it may concern:*

Be it known that I, RALPH C. JOHNSON, a citizen of the United States, and a resident of the city of Chicago, county of Cook, and State of Illinois, have invented certain new and useful Improvements in a Combined Motor Vehicle and Boat, of which the following is a specification.

My invention relates to combined land and water vehicles, and more particularly to motor vehicles of the automobile type having provisions adapting it for travel in the water also.

The principal objects of this invention are to provide a motor vehicle which is suitable for all the ordinary purposes of an automobile and which is adapted to act as a motor boat when so desired.

Specific objects are to provide means for making available in an efficient manner for marine use the power plant of what is normally an automobile; also to provide a device of this kind in which substantially standardized automobile construction may be employed, including a radiator for the engine, the engine itself, steering apparatus, transmission, etc., thus making for high efficiency as an automobile, and in which such effective driving mechanism may be employed to propel the device in water.

A further object is to provide a land and water vehicle in which the boat body may be positioned advantageously close to the plane of the wheel base, and one in which there is a low center of gravity and a well balanced arrangement of parts advantageous in use both as a motor boat and automobile.

Other objects and advantages will appear hereinafter.

In the accompanying drawings, which form a part of this specification, I have illustrated a preferred embodiment of these improvements in a vehicle of the automobile type. The boat body, engine, radiator, steering apparatus, transmission gearing, means for operating the same, jack shaft, differential apparatus, wheels and similar well known parts may be constructed according to present well known practices, and I have therefore shown such parts largely in outline.

In these drawings, Figure 1, is a side view of the vehicle; Fig. 2 is a medial longitudinal vertical section through the device of Fig. 1, some parts being shown in full for convenience of illustration; Fig. 3 is a top view of the device of Fig. 1; Fig. 4 is a front view of the device of Fig. 1, with the front end or bow of the boat body cut away to show the radiator, as on the line 4—4 of Fig. 3; Fig. 5 is a rear view of the vehicle with the stern portion of the body cut away, as on the line 5—5 of Fig. 3; Fig. 6 is a fragmentary vertical sectional view showing the power transmission means between the transmission shaft, jack shaft and propeller shaft in one relative position of the operative parts; and Fig. 7 is a side elevation of the apparatus of Fig. 6 showing the parts in another operative relation to each other.

The boat body 10 is preferably made of sheet metal and preferably has the cover portions 10ª and 10ᵇ leaving an open space or cock pit 10ᶜ for the occupants of the car or boat. A door 11 may be provided, the joints of which should be water-tight, especially if it extends below the water line when used as a boat. The front and rear ends of the body 10 are supported preferably by drop axles 12 and 13 passing beneath the boat body with sufficient clearance for spring action, the ends of the axles carrying the front and rear wheels 14 and 15 respectively. Springs, suitably of the semi-elliptical leaf type, as 16 and 17, having their ends respectively supported by the boat body, as by the stay elements 18 in front, the stay elements 19 and the links 20 at the rear (the links 20 having a portion, as 21, formed as a bearing for the jack shaft), the axles 12 and 13 being secured to the springs intermediate their ends in any well known way. The front wheels are turned for steering by means of steering knuckles 21 connected for unitary movement by a rod 22, one of the steering knuckles being connected with any conventional form of steering head 23 through the medium of the rod 24. A steering wheel 25 on the steering post 26 operates in the usual manner with the wheel shifting apparatus 23. All of this steering structure mentioned being old, it is only necessary to point out that means must be provided for preventing water from entering the boat body where the steering apparatus issues therefrom, which may suitably be done by forming a cup-shaped or indented portion as 27 (shown sectionally in Fig. 2) for the steering head 23, the steering post 26 being secured to this portion 27 with a water-tight joint, as at 28.

The engine 30 actuates the fan or blower 31 in the usual way, as by the belt 32, drawing air through the radiator 33, also of any known construction. To provide suitable access of air to the radiator I make the relatively long opening 34 in the top 10ª and preferably add the air catching and deflecting apron 35. The opening 34 has large capacity so that an abundance of air may be had for cooling the liquid passing through the engine casing and radiator.

The transmission device 36 will be understood to have an arrangement of shafts and gear wheels adapted to be operated by the engine shaft (not shown) and to provide various speeds and a reversal of rotation of the transmission shaft 37, and that a lever, as 36ª, is employed to shift the gears of the transmission device 36, such transmission device being well known and not requiring illustration in detail.

It is therefore understood that the transmission shaft 37 issuing from the transmission device 36 may have various speeds of rotation and reversal of rotation at the will of the operator. In my improved construction I employ a jack shaft or counter shaft 40 extending across the vehicle, its ends 40ª protruding from the boat body, and being suitably bushed or packed to prevent water from entering the body at these points. This jack shaft is in two parts, connected through the differential 41, all as is well understood. The ends of the jack shaft carry gears 42, and the rear wheels 15 carry gears 43, a chain 44 on these gears respectively completing the well known in transmission. The gears and chain r be suitably protected by the housing 45. Brake drums 46 are shown on the jack shaft 40, other details of the braking mechanism not being shown.

By turning to Figs. 6 and 7 it will be noted that the bevel gear 50 transmitting rotative movement to the differential gear 51 is drivingly connected with the clutch element 52, and that a coöperating clutch element 53, suitably integral with the gear 54, and having provisions for shifting the same, as the annular groove 55, is slidingly mounted on the transmission shaft 37, as by the spline 56; and, further, that by moving the lever 57 these elements 53 and 54 will be moved longitudinally on the shaft 37 through the connecting rod 58 secured to the collar element 59 loosely mounted in the annular groove 55. Preferably beneath the parts just described I position the propeller shaft 60, which may suitably have a bearing in the differential casing, as at 61, and is provided with the end thrust bearing 62. This shaft 60 carries the gear 63 adapted to intermesh with the gear 54. It will now be clear that when the lever 57 is moved to the left when positioned as shown in Fig. 6 the gear 54 will be caused to intermesh with the gear 63 causing the propeller shaft 60 to rotate, and this at various speeds, or with its rotation reversed, through the operation of the transmission mechanism 36. A propeller, as 64, is secured to the shaft 60, and thus movement of the vehicle in the water may be obtained.

It will be noted from the dotted lines of Fig. 7 that the gear 54 may be made to engage but partially the gear 63 and that while in such partial engagement the clutch elements 52 and 53 are still in engagement with each other, from which it will be clear that as the transmission shaft 37 rotates, rotative motion will be communicated both to the propeller shaft 60 and to the jack shaft 40, and that thus the driving wheels 15 will turn while the propeller is in action. This provision is advantageous where the vehicle is in shallow water and the coöperation of the two means of propulsion can simultaneously be employed, as in entering the water or coming out upon the land. It is also clear from the full lines of Fig. 7 that when the gears 54 and 63 are in full engagement with each other the clutch elements 52 and 53 are entirely separated, and that thus only the propeller shaft is rotated, the driving wheels not moving. It is also apparent that when the clutch elements 52 and 53 are in full engagement with each other only the driving wheels are operated, the propeller shaft not turning on its axis.

I prefer to employ a pair of rudders 65, 65ª, pivoted as at 66 to the boat body, these rudders being caused to move in unison through the medium of a lever arm 67 on each rudder and pivotally connected together by the rod 68, cords 69 and 70 being attached to the steering elements 67 or 68 so as to pull in opposite directions, as illustrated, these cords passing over the drum 71 of the hand wheel 72, by which the rudders are actuated and the device steered in the water. This arrangement prevents the steering apparatus from extending objectionably beyond the body when traveling on land. The gasolene or other combustion fluid tank 75 is preferably positioned in the stern of the vehicle body in the arrangement of parts shown, thus contributing to the equable distribution of the weight carried by the wheels or body of the boat.

While I have illustrated and described a preferred embodiment of these improvements, the invention is not limited to the specific arrangement or construction shown. Reference should be had to the appended claims to determine the scope of the improvements herein set forth, and all changes and modifications are contemplated by me as fall within the scope of these claims.

I claim:

1. In a combined motor vehicle and boat, the combination of driving wheels for land service, propelling means for water service, a driving shaft, means for communicating rotative motion from said driving shaft to said wheels and to said propelling means whereby either of said driving means may operate independently of the other, and whereby each thereof may operate in conjunction with the other thereof.

2. In a combined motor vehicle and boat, the combination of traction wheels for land service, propelling means for water service, a transmission shaft, means for communicating rotative motion from transmission shaft to said wheels and to said propelling means whereby either of said driving means may operate independently of the other, and whereby each thereof may operate in conjunction with the other thereof.

3. In a combined motor vehicle and boat, the combination of a transmission shaft, a pair of driving wheels, means for communicating rotative motion to said wheels from said transmission shaft, a propeller shaft, and means in operative association with said propeller shaft and said transmission shaft adapted to rotate said propeller shaft independently of rotation of said wheels, said means being also adapted to rotate said propeller shaft and said driving wheels simultaneously.

4. In a combined motor vehicle and boat, the combination of driving wheels for land service, a propeller shaft and propeller rotatably mounted for water service, a transmission shaft, and means for communicating rotative motion from said transmission shaft to said driving wheels and to said propeller shaft simultaneously and to either thereof independently of the other, said means including a clutch element in driving relation to said wheels, a gear in driving relation to said propeller, a driving gear slidable on said transmission shaft and having a clutch element adapted to engage said other clutch element, the arrangement being such that said clutch elements may be in engagement with each other while said gears are out of engagement with each other, also that said gears and said clutch elements may be simultaneously in engagement with each other respectively and also that said gears may be in engagement with each other while said clutch elements are out of engagement with each other.

RALPH C. JOHNSON.

Witnesses:
M. M. KRIESAND,
FRANKLIN M. WARDEN.